United States Patent
Masui et al.

(10) Patent No.: US 8,104,053 B2
(45) Date of Patent: Jan. 24, 2012

(54) OPTICAL PICKUP GUIDE MECHANISM WITH EDGE RAIL PORTION

(75) Inventors: Makoto Masui, Osaka (JP); Takayuki Murakami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 783 days.

(21) Appl. No.: 11/984,162

(22) Filed: Nov. 14, 2007

(65) Prior Publication Data

US 2008/0120632 A1 May 22, 2008

(30) Foreign Application Priority Data

Nov. 20, 2006 (JP) ................ P2006-313301

(51) Int. Cl.
*G11B 7/00* (2006.01)
*G11B 17/03* (2006.01)
*G11B 17/028* (2006.01)
*G11B 19/20* (2006.01)

(52) U.S. Cl. .......... 720/674; 720/681; 720/689

(58) Field of Classification Search .......... 720/671–681, 720/689
See application file for complete search history.

(56) References Cited

U.S. PATENT DOCUMENTS

| | | | |
|---|---|---|---|
| 6,347,069 | B1 | 2/2002 | Wakikawa et al. |
| 2001/0008510 | A1* | 7/2001 | Nakayama et al. .......... 369/75.2 |
| 2007/0039013 | A1 | 2/2007 | Sun et al. |

FOREIGN PATENT DOCUMENTS

| | | |
|---|---|---|
| JP | (U) 4-49320 | 4/1992 |
| JP | 7-235063 | 9/1995 |
| JP | 2001-229548 | 8/2001 |
| JP | 2002-50055 | 2/2002 |
| JP | 2006-277940 | 10/2006 |

* cited by examiner

*Primary Examiner* — Craig A. Renner
*Assistant Examiner* — Gustavo Polo
(74) *Attorney, Agent, or Firm* — Morgan, Lewis & Bockius LLP

(57) ABSTRACT

A chassis is comprised of a resin material. A main shaft is attached to the chassis and extends in a first direction. A sheet metal frame is attached to the chassis and has an edge rail portion which extends in the first direction. The main shaft and the edge rail portion are adapted to guide the optical pickup in the first direction.

2 Claims, 4 Drawing Sheets

OPTICAL PICKUP GUIDE MECHANISM WITH EDGE RAIL PORTION

The disclosure of Japanese Patent Application No. 2006-313301 filed on Nov. 20, 2006 including specification, drawings and claims is incorporated herein by reference in its entirety.

BACKGROUND

The present invention relates to an optical pickup guide mechanism, and more particularly, to the optical pickup guide mechanism including a chassis made of a resin material, a main shaft attached to the chassis and a sheet metal frame attached to the chassis, instead of a sub shaft. The main shaft and the sheet metal frame guide an optical pickup in a straight line path.

FIG. 5 is a schematic top view illustrating an exemplary configuration of a related-art guide mechanism. The related-art guide mechanism includes a main shaft 2 and a sub shaft 3 which are metal rods mounted on a chassis 1, and thus an optical pickup 4 is guided by the main shaft 2 and the sub shaft 3 so as to move in a straight line path A. In addition, the chassis 1 includes a turn table 5 for rotating an optical disk.

In the related-art guide mechanism shown in FIG. 5, the main shaft 2 serves to move smoothly the optical pickup 4, and the sub shaft 3 serves to suppress shaking in the movement of the optical pickup 4. In FIG. 5, the sub shaft 3 employs the same metal rod as the main shaft 2.

In the other related-art guide mechanism, an edge of the chassis is used for guiding the optical pickup instead of the sub shaft (for example, see Patent Document 1 and Patent Document 2). FIG. 6 illustrates a schematic perspective view of such a related-art guide mechanism. In the related-art guide mechanism shown in FIG. 6, a side wall 11 of an opening formed on the chassis 1 serves as the sub shaft, and the optical pickup 4 includes a recessed guide groove portion 41 which is engaged with the side wall 11 so as to freely slide on the side wall 11.

Additionally, in still another related-art guide mechanism, a transporting unit of an optical pickup is configured such that a guide member formed of a sheet metal and fixed on the chassis by a screw serves as the sub shaft (for example, see Patent Document 3).

Patent Document 1: Japanese Utility Model Publication No. 4-49320A
Patent Document 2: Japanese Patent Publication No. 2002-50055A
Patent Document 3: Japanese Patent Publication No. 7-235063A When the metal rod is used as the sub shaft 3 as described in the related-art guide mechanism shown in FIG. 5, a cost of the entire guide mechanism is increased due to a high cost of the metal rod.

From this viewpoint, when the side wall 11 which is the edge of the chassis is used as the sub shaft, there is no need to employ the expensive rod. However, in such a case, it is necessary to employ the sheet metal for the entire chassis in order to suppress a decrease in guide performance caused by abrasion of the side wall 11, and thereby the cost of the entire guide mechanism increases. If the chassis 1 is made of the resin material instead of the sheet metal, the guide performance may decrease due to the abrasion of the chassis 1.

SUMMARY

Accordingly, it is an object of the invention to provide an optical pickup guide mechanism which can prevent a decrease in guide performance caused by the abrasion even when a chassis thereof is made of the resin material by configuring an edge rail portion of an inexpensive thin sheet metal frame as the sub shaft, instead of an expensive metal rod.

In addition, it is another object of the invention to provide an optical pickup guide mechanism for maintaining good guide performance even in a case where an inexpensive thin sheet metal is used as the frame.

In order to achieve the above objects, according to a first aspect of the invention, there is provided optical pickup guide mechanism for guiding an optical pickup, comprising: a chassis comprised of a resin material; a main shaft attached to the chassis and extending in a first direction; and a sheet metal frame attached to the chassis and having an edge rail portion extending in the first direction, wherein the main shaft and the edge rail portion are adapted to guide the optical pickup in the first direction.

With such a configuration, the expensive metal rod serving as the sub shaft 3 shown in FIG. 5 can be replaced by the edge rail portion of the sheet metal frame attached to the chassis. As a result, it is possible to provide a low cost guide mechanism as a whole.

The edge rail portion may include a rib portion formed by bending an edge of the sheet metal frame; and a width of the rib portion may be determined so as to match with a width of a groove provided in the optical pickup so that the groove is slidably engaged with the rib portion.

With such a configuration, an excellent guide operation can be exhibited with respect to the groove of the optical pickup, which generally has a fixed width even when an inexpensive thin sheet metal is used as the frame.

According to a second aspect of the invention, there is also provided an optical pickup guide mechanism for guiding an optical pickup, comprising: a chassis comprised of a resin material; a main shaft attached to the chassis and extending in a first direction; a sheet metal frame attached to the chassis and having an edge rail portion extending in the first direction, wherein: the main shaft and the edge rail portion are adapted to guide the optical pickup in the first direction; the edge rail portion includes a rib portion formed by bending an edge of the sheet metal frame; and a thickness of the edge rail portion, which is defied by a width of the rib portion is determined by adjusting a bending angle of the rib portion so as to match with a width of a groove provided in the optical pickup so that the groove is slidably engaged with the rib portion.

According to a third aspect of the invention, there is provided an optical pickup guide mechanism comprising: an optical pickup; a chassis comprised of a resin material; a main shaft attached to the chassis and extending in a first direction; and a sheet metal frame attached to the chassis and having an edge rail portion extending in the first direction, wherein the optical pickup is slidably engaged with the main shaft and the edge rail portion of the frame to be movable in the first direction.

According to the above-described aspects of the invention, since the edge rail portion of the sheet metal frame serves as the sub shaft, it is not necessary to employ the expensive metal rod as the sub shaft, and a decrease in guide performance caused by the abrasion and the like can be prevented even when a chassis thereof is made of a resin material. Moreover, there is an advantage that excellent guide performance can be exhibited even when an inexpensive thin sheet metal is used as the frame.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
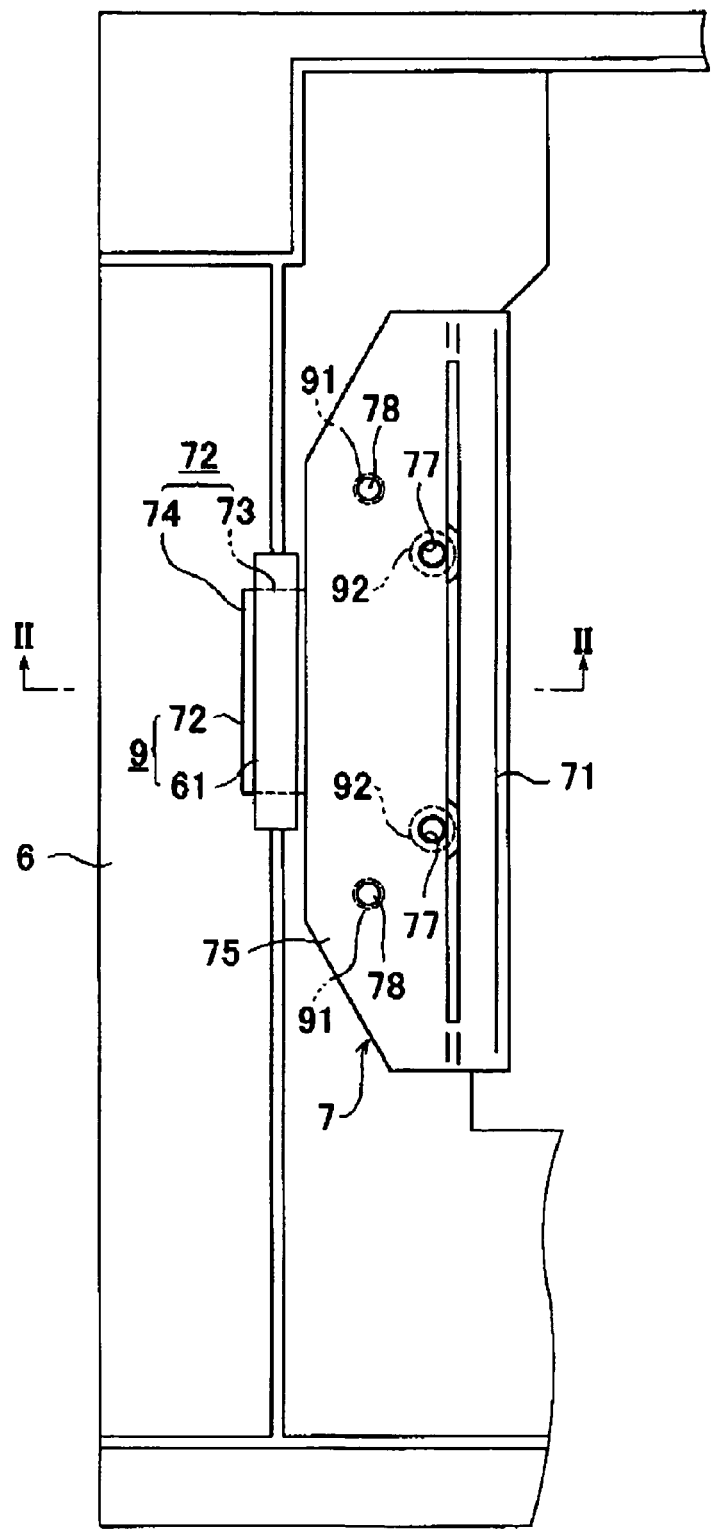
FIG. 1 is a schematic top view illustrating a guide mechanism according to an embodiment of the invention.

In FIG. 1, a chassis 6 is made of a resin material. Not only a main shaft and a turn table (not shown), but also a frame 7 made of a sheet metal are mounted on the chassis 6. An edge rail portion 71 included in the frame 7 serves as the sub shaft. Accordingly, an optical pickup which is not shown in FIG. 1 is guided in a straight line path by the edge rail portion 71 and the main shaft which is not shown in FIG. 1.

Figure 2:
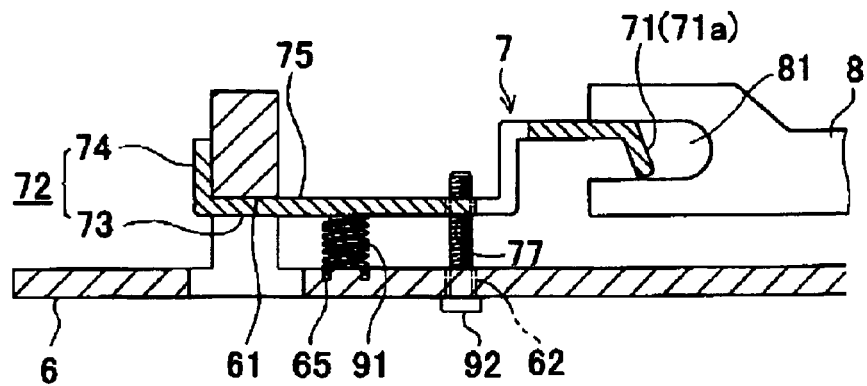
FIG. 2 is a section view taken along the line II-II in FIG. 1.
Figure 3:
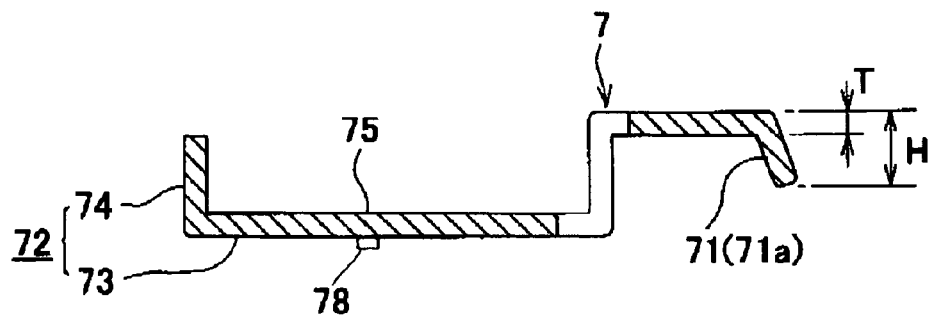
FIG. 3 is a section view of a frame according to the embodiment.

As shown in FIG. 3, an inexpensive thin sheet metal is used in the frame 7 and the edge rail portion 71 includes a rib portion 71a formed by bending an edge of the frame 7. As described above, when the edge rail portion 71 is formed by the bent rib portion 71a, a thickness of the edge rail portion 71 (i.e. a width of the rib portion) can be determined so as to match with a groove width of the guide groove portion 81, which is provided in an optical pickup 8 shown in FIG. 2 in a transverse direction, even when the inexpensive thin sheet metal is used as the frame 7. Moreover, the thickness of the edge rail portion 71 increases and decreases when a bending angle of the rib portion 71a is increased and decreased by employing the method in which the edge rail portion 71 is formed by the bent rib portion 71a. Therefore, it is advantageous to easily match the thickness of the edge rail portion 71 with the groove width of the guide groove portion 81.

As shown in FIG. 1, the frame 7 includes a locking piece 72 formed in an end portion opposite to an end portion in which the rib portion 71a is formed, at the center in a longitudinal direction thereof. In addition, the flat plate portion 75 extended over between the locking piece 72 and the rib portion 71a has screw holes 77 and 77. Spring receiving portions 78 and 78 are formed on and projected from the rear side of the flat plate portion 75. Moreover, as shown in FIG. 3, the locking piece 72 includes a principal portion 73 extended from the flat plate portion 75 and a detachment preventing portion 74 having a vent piece shape formed on the principal portion 73.

Figure 5:
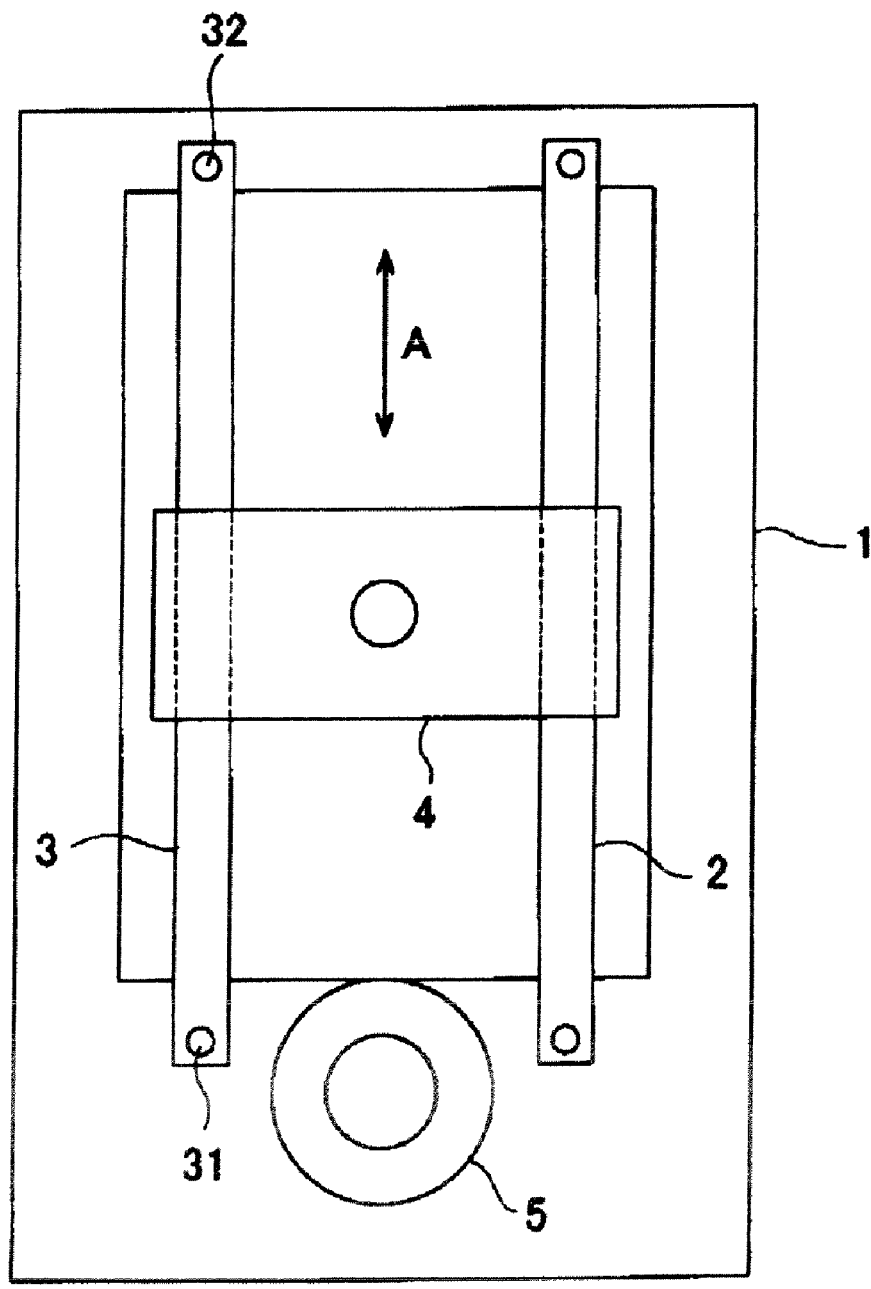
FIG. 5 is a schematic top view illustrating a related-art guide mechanism.
Figure 6:
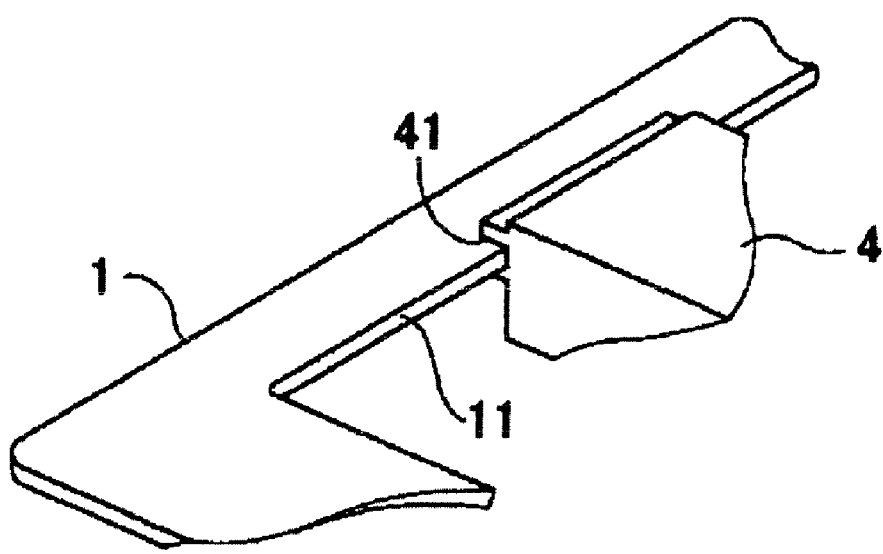
FIG. 6 is a schematic perspective view of a related-art guide mechanism disclosed in the Patent Document 1 or the Patent Document 2.

The frame 7 is attached to the chassis 6 via a mounting structure having a function for adjusting a frame posture, which is described as follows. As shown in FIG. 1 and FIG. 2, the mounting structure includes an engaging tool 9 formed by the locking piece 72 of the frame 7 and a window-shaped locking hole portion 61 which is formed on the chassis 6 and in which the locking piece 72 is inserted and locked; spring bodies 91 interposed between the chassis 6 and the frame 7 and formed of a coil spring that locks the principal portion 73 by urging the principal portion 73 to the locking hole portion 61; and adjustment screws 92 inserted into screw insertion holes 62 of the chassis 6 and formed so as to freely adjust an amount of screw insertion into the screw holes 77 of the frame 7. The spring body 91 is interposed between a spring seat 65 formed in a ring shaped groove on the chassis 6 side and the spring receiving portion 78 of the frame 7 so as not to be displaced. In addition, the adjustment screws 92 are symmetrically arranged on two locations distanced from each other in a moving direction (see the arrow A in FIG. 5) of the optical pickup and are configured to be able to individually adjust the amount of screw insertion of the two adjustment screws 92 and 92 into the screw holes 77 and 77 of the frame 7 side. In addition, since the adjustment screw 92 is screwed into the screw hole 77, a location, in which the locking piece 72 is engaged with the locking hole portion 61, for forming the rib of the frame 7 is prevented from being pushed up by elastic force of the spring body 91.

When the mounting structure of the frame 7 on the chassis 6 has the aforementioned configuration, the amount of screw insertion of the adjustment screws 92 and 92 into the screw holes 77 and 77 is individually adjusted to increase and decrease. With such a configuration, for example, the frame 7 accompanied with the edge rail portion 71 can be tilted by moving up and down one end or the other end thereof in the longitudinal direction, and a posture of the edge rail portion 71 serving as the sub shaft can be finely adjusted with respect to the main shaft not shown in the drawings by the manipulation just mentioned above.

Figure 4:
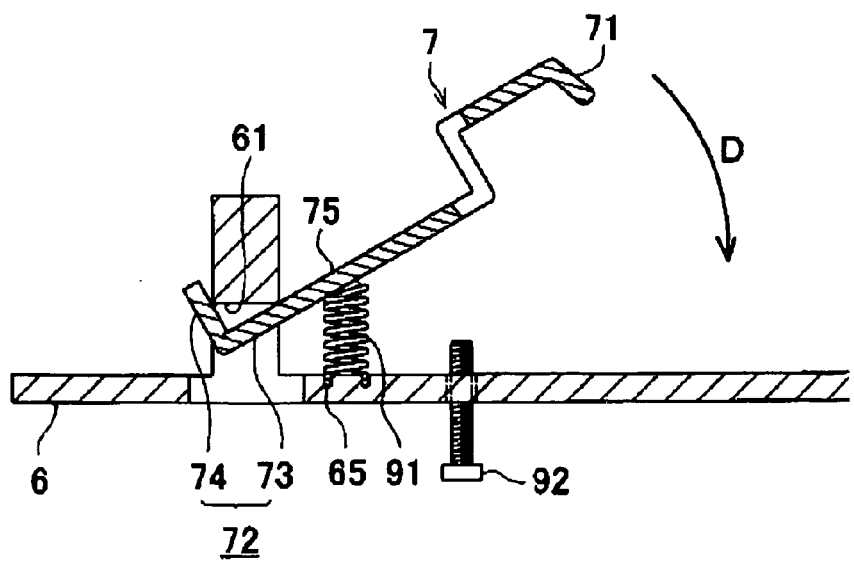
FIG. 4 is an explanatory diagram of a frame mounting process according to the embodiment.

The frame 7 has a regulating member which is not shown in the drawings. When the frame 7 having the locking piece 72 locked in the locking hole portion 61 is pushed up by elastic force of the spring body 91, the regulating member regulates a push-up width of the frame 7. As shown in FIG. 4, in order to mount the frame 7 on the chassis 6, the frame 7 pushed up by elastic force of the spring body 91 that is previously mounted on the spring seat 65 of the chassis 6 is first temporally fixed by an operation of the regulating member. And thus, a possibility that the spring body 91 is lost by bouncing away in the attachment process can be decreased. Next, as shown by arrow D in FIG. 4, the rib portion is pressed down against elastic force of the spring body 91 in the state where the locking piece 72 of the frame 7 is locked in the locking hole portion 61. Then, by screwing the adjustment screw 92 into the screw hole 77 of the frame 7, the frame 7 is attached to the chassis 6.

In this embodiment as shown in FIG. 3, a sheet metal of which a thickness T is about 1 mm is used in the frame 7. In addition, in consideration that the groove width of the guide groove portion 81 of the optical pickup 8 is about 3 mm, vertical width H of the rib portion 71a serves as the edge rail portion 71 of the frame 7 is determined to be less than 3 mm. With such a configuration, the thickness of the edge rail portion 71 serving as the sub shaft becomes a size matching the groove width, which is generally 3 mm, of the guide groove portion 81.

What is claimed is:

1. An optical pickup guide mechanism for guiding an optical pickup, comprising:
    a chassis comprised of a resin material;
    a main shaft attached to the chassis and extending in a first direction; and
    a sheet metal frame attached to the chassis and having an edge rail portion extending in the first direction,
    wherein the main shaft and the edge rail portion are adapted to guide the optical pickup in the first direction,
    wherein the edge rail portion includes a rib portion formed by bending an edge of the sheet metal frame, wherein a thickness of the edge rail portion, which is defined by a width of the rib portion, is determined by adjusting a bending angle of the rib portion so that the thickness of the edge rail portion increases and decreases when the bending angle of the rib portion is increased and decreased so as to match with a width of a groove provided in the optical pickup so that the groove is slidably engaged with the rib portion, wherein the edge of the sheet metal frame is bent at an obtuse angle to form the rib portion, wherein the chassis is provided with a spring seat, the sheet metal frame is provided with a spring receiving portion, and a spring body is interposed between the spring seat of the chassis and the spring receiving portion of the sheet metal frame so as to push up the sheet metal frame relative to the chassis by an elastic force of the spring body, and wherein the chassis is provided with two screw insertion holes, the sheet metal frame is provided with two screw holes, and two adjustment screws are symmetrically arranged at two locations distanced from each other in the first direction, inserted into the screw insertion holes of the chassis, and screwed into the screw holes of the sheet metal frame.

2. An optical pickup guide mechanism comprising:
an optical pickup;
a chassis comprised of a resin material;
a main shaft attached to the chassis and extending in a first direction; and
a sheet metal frame attached to the chassis and having an edge rail portion extending in the first direction, wherein the optical pickup is slidably engaged with the main shaft and the edge rail portion of the frame to be movable in the first direction, wherein the edge rail portion includes a rib portion formed by bending an edge of the sheet metal frame, wherein a thickness of the edge rail portion, which is defined by a width of the rib portion, is determined by adjusting a bending angle of the rib portion so that the thickness of the edge rail portion increases and decreases when the bending angle of the rib portion is increased and decreased so as to match with a width of a groove provided in the optical pickup so that the groove is slidably engaged with the rib portion, wherein the edge of the sheet metal frame is bent at an obtuse angle to form the rib portion, wherein the chassis is provided with a spring seat, the sheet metal frame is provided with a spring receiving portion, and a spring body is interposed between the spring seat of the chassis and the spring receiving portion of the sheet metal frame so as to push up the sheet metal frame relative to the chassis by an elastic force of the spring body, and wherein the chassis is provided with two screw insertion holes, the sheet metal frame is provided with two screw holes, and two adjustment screws are symmetrically arranged at two locations distanced from each other in the first direction, inserted into the screw insertion holes of the chassis, and screwed into the screw holes of the sheet metal frame.

* * * * *